INTERMITTENT MECHANISM AND METHOD OF MAKING THE SAME
Original Filed June 12, 1967 4 Sheets-Sheet 1
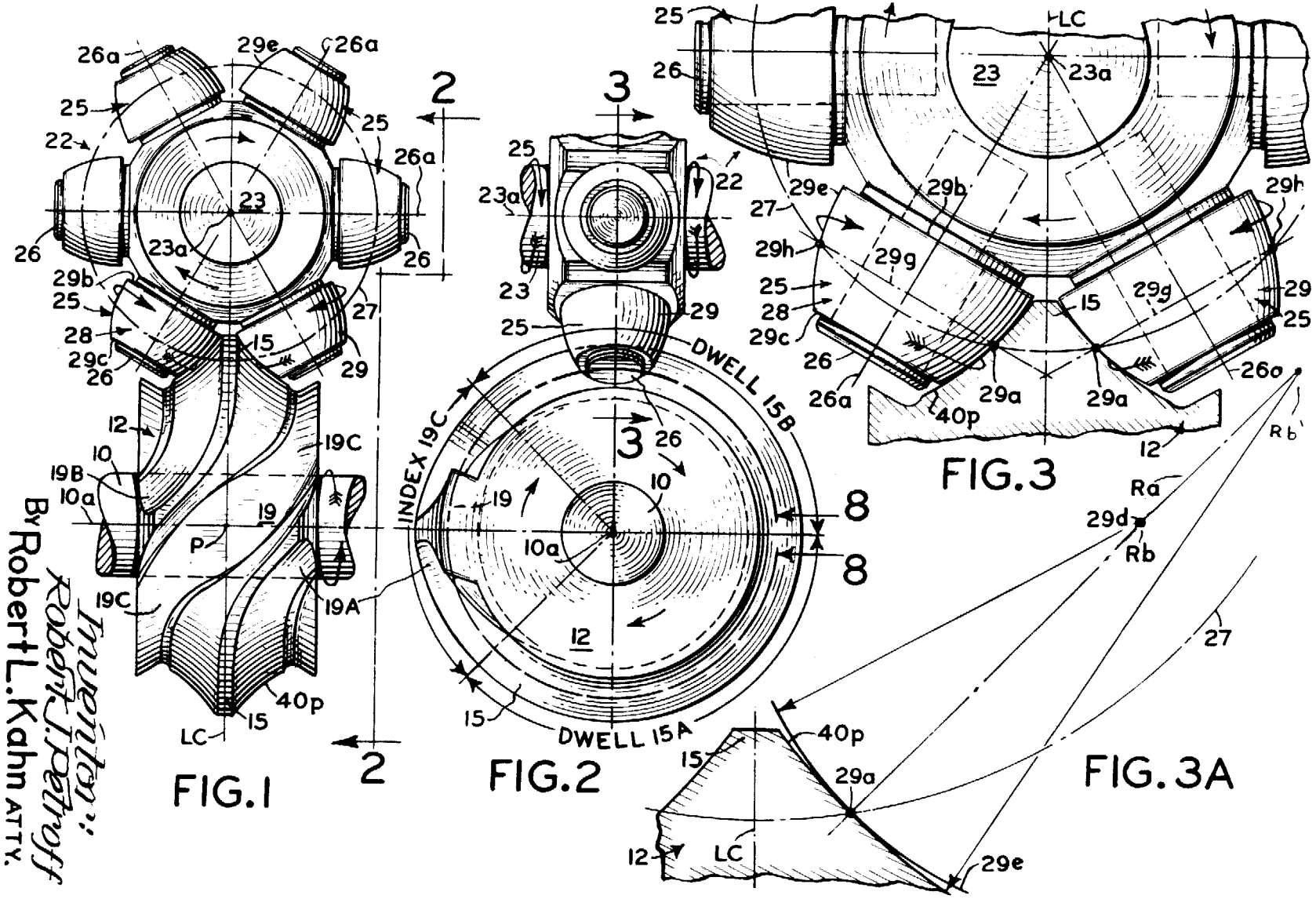
Inventor:
Robert J. Petroff
By Robert L. Kahn Atty.

INTERMITTENT MECHANISM AND METHOD OF MAKING THE SAME
Original Filed June 12, 1967 4 Sheets-Sheet 2
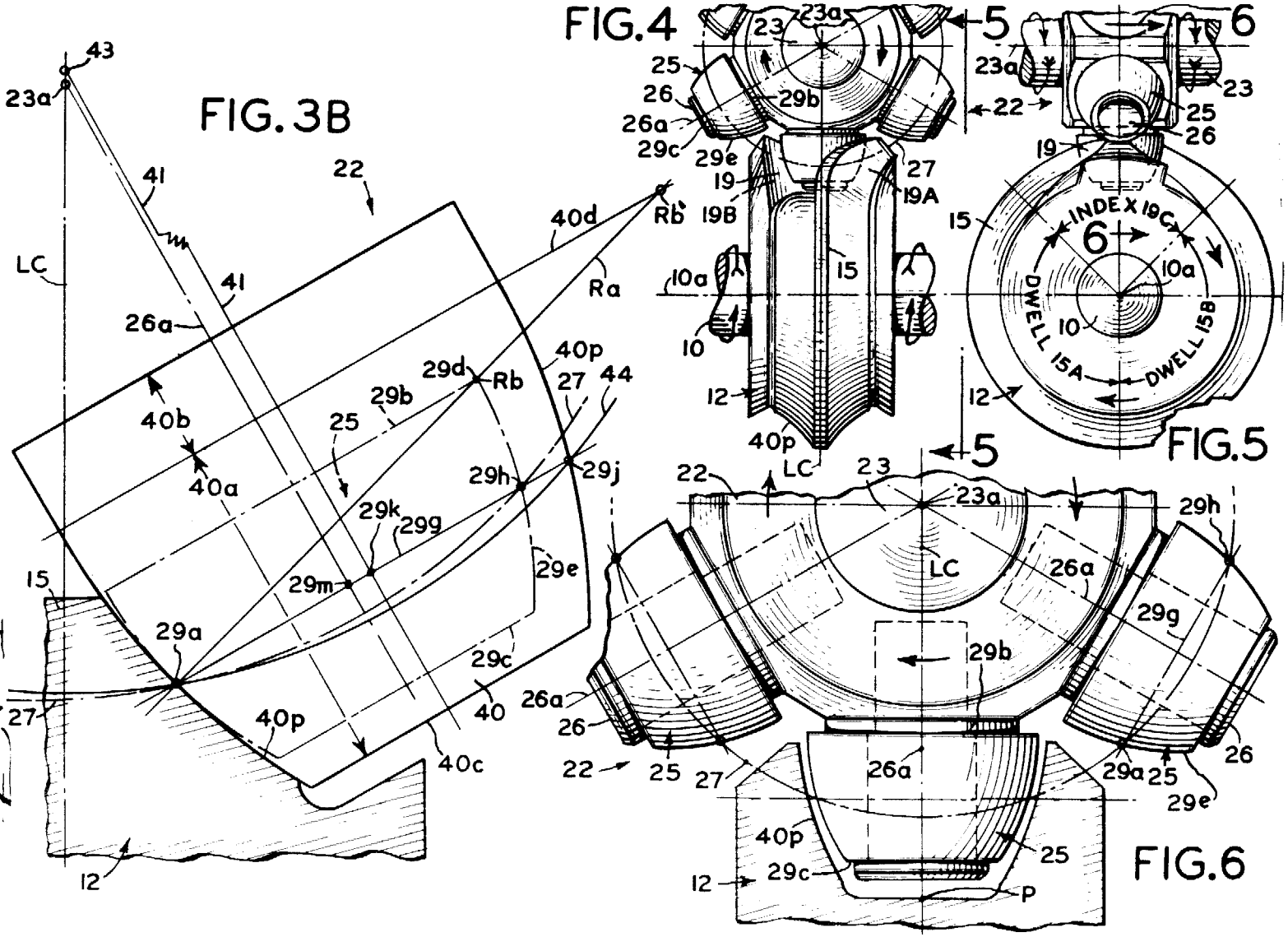
Inventor:
Robert J. Petroff
By Robert L. Kahn Atty.

INTERMITTENT MECHANISM AND METHOD OF MAKING THE SAME
Original Filed June 12, 1967 4 Sheets-Sheet 3
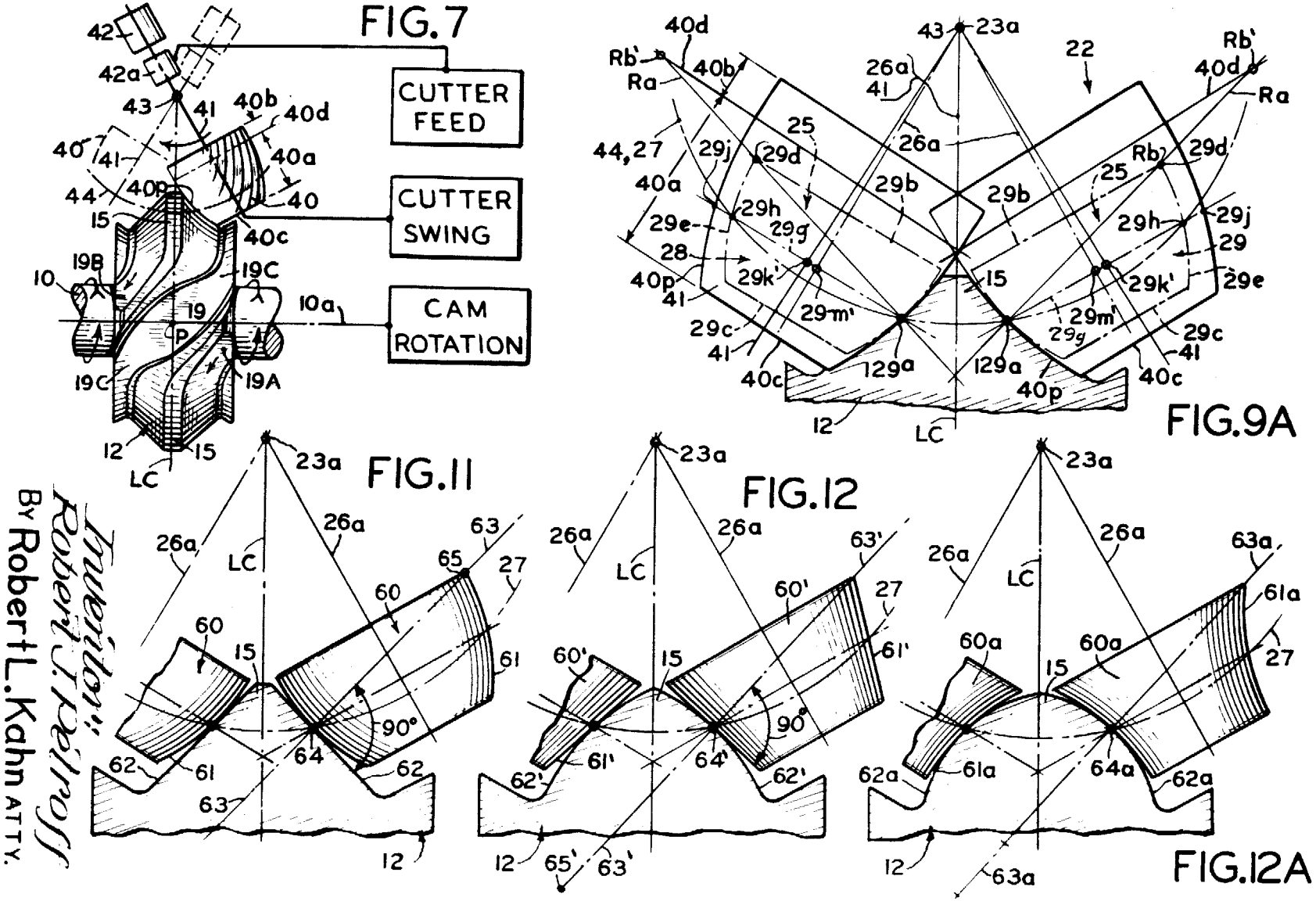
Inventor:
Robert J. Petroff
By Robert L. Kahn Atty.

INTERMITTENT MECHANISM AND METHOD OF MAKING THE SAME
Original Filed June 12, 1967 4 Sheets-Sheet 4
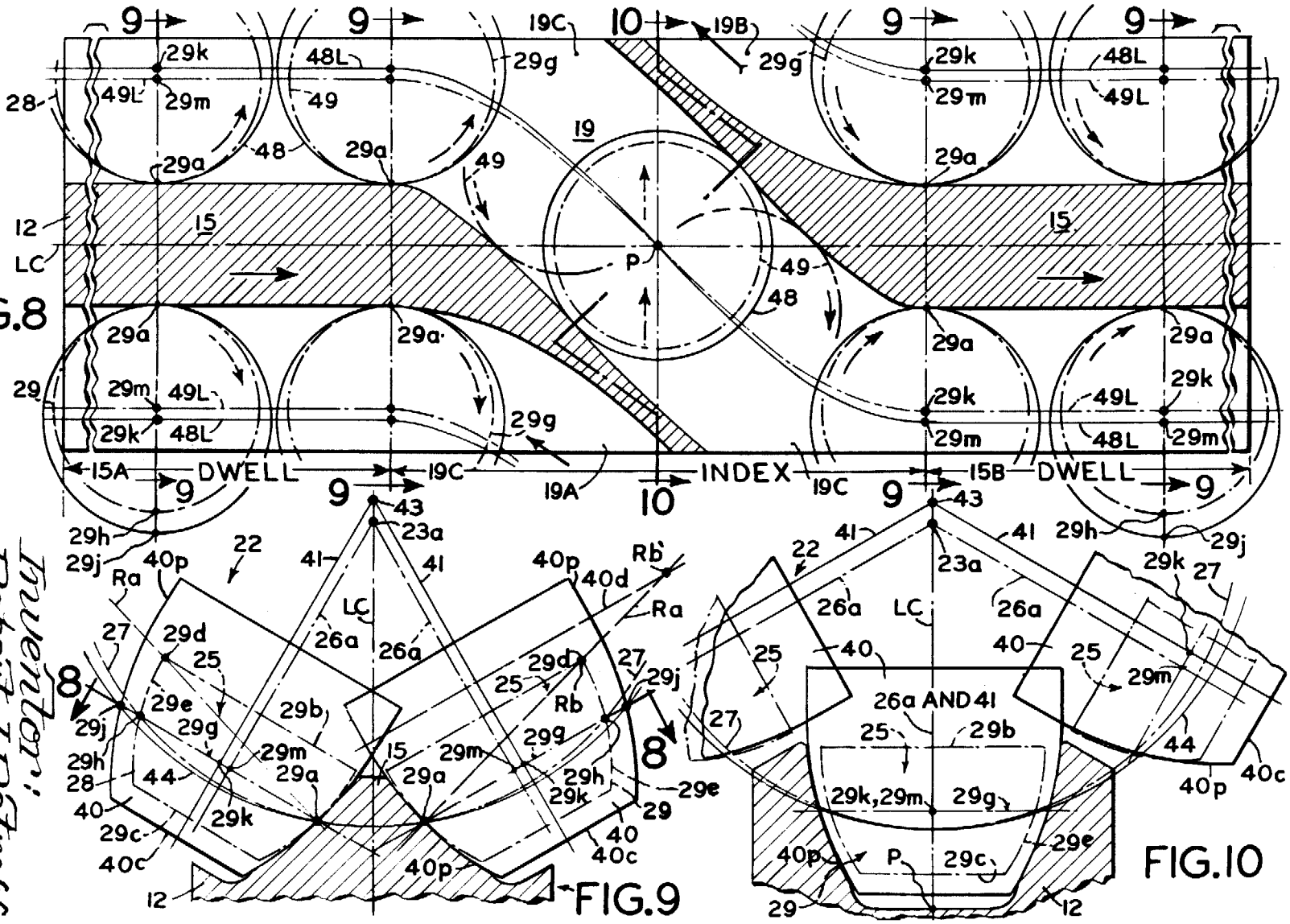
Inventor:
Robert J. Petroff
By Robert L. Kahn Atty.

United States Patent Office

Re. 26,979
Reissued Nov. 17, 1970

26,979
INTERMITTENT MECHANISM AND METHOD OF MAKING THE SAME

Robert J. Petroff, Lombard, Ill. (% Standard Automatic Inc., 867 Industrial Drive, Elmhurst, Ill. 60126)

Original No. 3,456,529, dated July 22, 1969, Ser. No. 645,403, June 12, 1967. Application for reissue Oct. 15, 1969, Ser. No. 877,914
Int. Cl. B23f *9/00;* B23q *17/00;* F16h *1/16*
U.S. Cl. 74—817 17 Claims

Matter enclosed in heavy brackets [ ] appears in the original patent but forms no part of this reissue specification; matter printed in italics indicates the additions made by reissue.

ABSTRACT OF THE DISCLOSURE

The intermittent mechanism herein is a modified roller gear type including a concave globoidal cam having a track cooperating with rollers extending radially from a turret. The roller surface and cooperating cam track sides have such relative curvatures that a theoretical point contact therebetween is provided. As is customary, the cam track generating cutter is larger transversely than a turret roller to provide sidewall clearance for a roller. However the cutter, during cam generation, is so controlled that at positions corresponding to dwell, the center of the cutter is not coincident with a roller axis at dwell. Instead, the cutter center is laterally displaced so that at each dwell position, the cutter center is beyond the roller center away from the line extending between the turret and cam axes. This lateral displacement of the cutter center from roller center at dwell is equal to one-half the track-roller clearance and places the cutter profile generating the cam rib side of each track in exactly the position assumed by the roller at dwell. This makes the arcuate spacing between cutter center positions at dwell greater than between roller centers at dwell along a pitch circle. Thus the cutter generating the track wall at dwell is exactly in the same wall contacting position as rollers at dwell. Thus the rolling point for track wall and roller cooperation at dwell is exactly the same point as created by the cutter contour for rolling action. The roller thus substitutes for the cutter at dwell and makes a tight fit at dwell without further adjustment.

This invention relates to an intermittent drive of the so-called roller gear type. A conventional roller gear drive has a concave globoidal cam containing a cam track having dwell and turret index portions. A conventional drive has straight sided cam track walls (the straight is with reference to the depth of the track) upon which ride cylindrical rollers mounted on studs or spindles extending radially from a turret. Cam rotation causes intermittent turret travel about the turret axis which is laterally offset from and perpendicular to the cam axis.

For accuracy, it is essential that at dwell, the turret be rigid and free of backlash. To accomplish this, it is necessary to have two adjacent turret rollers tightly straddle a cam rib separating dwell portions of the cam track. For turret rotary motion following dwell it is necessary that the cam track sidewalls force turret rollers in directions tending to turn the turret. The cam track must at all times provide adequate roller clearance. Defects inherent in operation of a cylinder roller in a cam track creates destructive wear and tear in a conventional roller gear mechanism irrespective of original care in design and manufacture thereof.

A conventional roller gear having a cylindrical roller surface riding a cam track cannot have a true rolling action. The ideal of a line contact between a cylindrical roller and a straight sidewall of a cam track imposes extraordinary accuracy requirements. Even if achieved, such accuracy is substantially destroyed with operation under load. It is impossible to equalize the uniform surface velocity of a cylindrical roller along a radial line of contact with different parts of the cam track sidewall along the track depth since such parts have different velocities. The outer end part of a roller will engage the bottom part of the cam track. This bottom part of the cam track inherently travels at a slower speed than the top part of the cam track although the angular travel is the same. It follows that a cylindrical roller operating in a cam track having straight sidewalls with reference to the track depth cannot have pure rolling contact and instead must slip or skid. This results in destructive nonuniform wear.

A further difficulty in a conventional roller gear drive is based upon the necessity for hand-finishing a cam track for acceptable roller gear operation. This is caused by substantial reduction in spacing between cam and turret axes for eliminating backlash at dwell, which in turn causes roller jamming when moving between dwells. The cam sidewall shapes of such a drive inherently have serious warping thereof after heat treatment. As a result, such cams are difficult to make if the cam wall surfaces are to be of fully hardened steel. It is necessary to work with such steel in softened condition and after the cam is completely finished, then it must be heat treated and cooled in accordance with well-known practice.

The conflicting design and operational requirements for a reasonably accurate roller gear drive having cylindrical rollers makes it impossible for such a drive to have a long, useful life. Instead, such a drive is inherently noisy and has considerable vibration. This vibration is due to a number of factors. One is the lack of accuracy and smoothness of the cooperating roller and cam track wall surfaces. Another is the inherent natures of the surfaces resulting in sliding or skidding of the turret followers against cam track surfaces. In addition, manufacturing difficulties in attempting to obtain theoretically perfect line contact between cylindrical turret followers and contacting cam track surfaces present serious problems in connection with reducing vibration. No matter how carefully a drive of this character is constructed and adjusted, the inherent mode of operation results in uneven and destructive wear. Heavy cantilever forces against studs or spindles carrying rollers during turret movement cause sufficient spindle deflection to destroy the idealized line contact between roller and cam track. Instead such deflection may cause one part of a roller to contact one sidewall and cause a different part of the roller to contact the opposite sidewall. Because of these inherent defects, serious problems are present in the manufacture and operation of such conventional roller gear drives.

In accordance with the present invention, a roller and cam track sidewall are so shaped relative to each other that a true rolling point contact therebetween is provided generally resembling a ball rolling between two race surfaces making up a ball bearing structure. Such a point contact is theoretical and, under load, the contact region is enlarged to provide a small area. As long as the engaging metallic parts do not have stresses therein in excess of their respective elastic limits, this rolling "point" contact makes possible minimum friction and wear with maximum strength. This rolling action is obtained by providing a difference in curvature between the roller surface and cooperating cam track wall surface and also requires clearance between a roller and one cam track sidewall.

Such rolling action in a roller gear drive has been productive of unusual and beneficial results. The new cam structure can be heat treated for re-hardening without danger of substantial warping upon cooling. This desirable freedom from substantial warping results from the geometry of the cam wall wherein the base of a cam wall has a substantial thickness along the axis of the cam and this wall thickness decreases rapidly with increasing distance from the track bottom. It is well-known that such a tapering structure will have substantially less tendency to warp in connection with heat treatment than if the cam track wall thickness remains the same in a direction from the bottom of the cam track outwardly toward the periphery of the cam track wall. In addition, the new cam track wall structure is decidedly stronger than conventional cam track walls.

A cam track must be sufficiently wide so that a roller in such track cam never engage opposed track walls simultaneously. The cam track in the new drive is generated by a cutter having an appropriate shape for providing the desired wall shape or profile to obtain rolling action. The cutter control contemplated here makes it possible to utilize a predetermined rolling contact point between roller and track wall after drive assembly. By virtue of this cutter control the cam track wall produced by a cutter will provide a substantially predetermined contact point relation between roller and generated cam wall at roller dwell. Consequently a cam and turret when assembled to make a drive will provide a tight fit between rollers and cam rib at dwell. The geometry of the drive from cam generation through assembly to operation remains the same. The location of rolling contact points on track walls and rollers is not affected by assembly or pre-loading. This is in contrast with conventional roller gear drives which involve forcing a cam and roller together at dwell for pre-load. Such adjustment changes the geometrical characteristics of the drive and is partly responsible for some of the troubles in such a drive.

The cutter control may involve using an axis about which the cutter makes its cam generating pass in offset parallel relation to the turret axis or alternatively slightly tilting the cutter center line and using the turret axis about which to make a cutter pass. In either case, a cutter at one dwell part of its pass starts with its center beyond what has been the usual starting position for conventional roller gear drives. The cutter passes through to the other dwell position and ends in a corresponding position beyond the usual end position. The cutter center goes through an arcuate path in the present invention which is greater than the arcuate path taken by the roller center at successive dwells. The difference between these two path distances provides the prescribed clearance between roller and cam track sidewalls. The cutter at each dwell position is in effect in the same cam rib straddling position as the rollers at dwell, the roller and cutter centers not being coincident. It is the prescribed point of rolling contact on the roller which is concident with the corresponding cutter point.

An ancillary advantage of the invention resides in the ease with which a cam track generating tool can be redressed to compensate for wear, thus providing for salvage of a cutting tool. In a conventional roller gear drive, the cylindrical shape of the cutting tool makes salvage impossible after the cutter diameter is decreased by wear.

An exemplary embodiment of the invention includng the method and article will now be described in connection with drawings, it being understood that susbtantial variations may be made while adhering to the basic principles of the invention.

Referring now to the drawings: FIG. 1 is an elevation of a roller gear drive exemplifying the invention, the turret and cam less mountings being illustrated in dwell, the elevation being taken normal to the turret axis in a plane laterally offset from the cam.

FIG. 2 is an end elevation of the drive illustrated in

FIG. 1 along line 2—2 of FIG. 1 showing the cam and only a portion of turret roller.

FIG. 3 is a view on an enlarged scale generally along line 3—3 of FIG. 2, this view showing profiles of the curved surfaces where rolling contact exists between a roller and cam track sidewall, the geometrical relationships being distorted for illustrative purposes.

FIG. 3A is a detail on an even larger scale, illustrating the geometrical relationship of the centers of curvature of a profile of the cam track sidewall and roller, the showing being out of proportion for clarity of illustration and the point of rolling contact between roller and cam track profiles being idealized as midway between the outer and inner roller ends.

FIG. 3B is a greatly enlarged detail illustrating the relationship between the roller pitch circle and the cutter pitch circle, when the cutter pass axis is laterally offset.

FIG. 4 is a partial elevation generally resembling FIG. 1 but showing a turret roller at the cross-over point, this being theoretically midpoint in the indexing travel of the turret from one dwell to a succeeding dwell.

FIG. 5 is an elevation along line 5—5 of FIG. 4, corresponding generally to FIG. 2 except that the turret roller is at cross-over.

FIG. 6 is an enlarged idealized detail on line 6—6 of FIG. 5 illustrating the turret roller cross-over position, no attempt being made to show true relative curvatures and clearances in proper proportion.

FIG. 7 shows in part a diagrammatic view in an elevation plane somewhat similar to the elevation plane of FIG. 1 of a cam track generating means disposed in cooperative relationship to a cam blank having a precut rough track therein, this view also showing in block diagram the operational coupling between rotation of the cam blank and the swinging of the cam track cutter for final finish of the cam track and for cutter feeding at the end of each cutter pass.

FIG. 8 is a development of a cam track for the cam of FIG. 1 as an example, this development showing portions of the cam track rolled out circumferentially of the cam and also flattened to compensate for the angle between adjacent turret rollers (in this particular instance such angle being 60° between such rollers), the development being taken at depths in the cam structure corresponding to "pitch circle" arcs, the entire development making up FIG. 8 being taken between lines 8—8 of FIG. 2 circumferentially of the cam, and angularly on lines 8—8 of FIG. 9.

FIG. 9 is an enlarged view showing cam track wall profile and cutter and roller in dwell position corresponding to FIG. 1, the various dwell positions in FIG. 8 corresponding to the showing in FIG. 9 being illustrated by lines 9—9 at various points along the cam track, FIG. 9 also illustrating the cam track generating pitch line and the turret roller pitch line, the relative curvatures being distorted for explanatory purposes and the amount of offset of the cutting and turret axes also being distorted out of proper proportion for illustrative purposes.

FIG. 9A is a diagrammatic illustration showing the cutter pass axis coincident with the turret axis and the end points for the cutter in its pass.

FIG. 10 is a view somewhat similar to FIG. 9 except that the cutter for cam track generation and rollers on a turret are in a position corresponding to the cross-over position of the assembled drive as illustrated in FIG. 4.

FIG. 11 is a profile of roller and cam track wall where a straight line profile for cam track wall is provided.

FIG. 12 is similar to FIG. 11 but having the roller profile straight.

FIG. 12A shows a concave roller profile and convex cam track wall profile.

In the consideration of structures embodying the present invention and the method of manufacture, an idealized point contact will be assumed whose locus on the roller might be termed the equator of such roller, this being generally half way between the outer and inner ends of the roller. This point location in the design and manufacture of a drive is to allow for tolerances tending to cause the point of rolling contact to wander laterally from the idealized locus. Correspondingly, the cam track wall surface should theoretically have a rolling contact point locus which is well within the end points of a cam track sidewall profile. As long as the locus of rolling point contact on both the roller and cam track wall profiles is in a location between extremes, some actual wandering of the rolling contact points in an operating structure laterally of the locus can be tolerated.

By analogy to gears, the locus of a theoretical point contact on a turret roller, as the turret turns about the turret axis (assuming the theoretical point contact to be at a fixed radial distance from the turret axis) may be considered as a turret pitch circle. Correspondingly, the locus of the theoretical point contact (either on one or other sidewall of the cam track) assuming turret rotation and a fixed radial distance of the cam wall contact point from the cam axis can be considered as a cam track pitch circle. This will be explained more fully in connection with cam track generation.

That plane which is perpendicular to the cam axis and contains the turret axis will be referred to as the turret axis plane of symmetry. Similarly that plane which is perpendicular to the turret axis and contains the cam axis will be referred to as the cam axis plane of symmetry. These two planes are perpendicular to each other and intersect along a straight line which is perpendicular to both turret and cam axes and will be designated as the cam-turret offset line of centers, LC.

A turret and cam embodying the present invention in cooperating relation is illustrated. No attempt is made to show the physical mounting of the component parts of the drive since that is well known. Shaft 10 carries globoidal cam 12 rigidly secured thereto. Cam 12 has a continuous cam track about its outer surface, all to be more fully described later. Cam rib 15 extends circumferentially through a suitable dwell angle about cam 12, separating parallel cam track portions without pitch along the length of shaft 10 for turret dwell. Portions 19 of the cam track have pitch along the length of cam 12 for turret movement.

Cooperating with cam 12 is turret 22 rigidly secured to turret shaft 23. Axis 10a of cam shaft 10 is laterally offset from and perpendicular to axis 23a of turret shaft 23. Turret 22 has a plurality of equally spaced turret rollers 25, each of which is rotatively supported on turret spindle 26. Each roller may be provided with anti-friction means. A turret may have as many spindles as desired and while six are illustrated for ease of illustration, it is understood that the number can be any desired figure, either odd or even, with corresponding change in turret radius for obtaining a desired angular turret movement for each cam revolution.

FIG. 1 illustrates the cam and turret in dwell wherein adjacent rollers 28 and 29 ride opposite sides of cam dwell rib 15. To prevent backlash or play of turret 22 about its axis during dwell, it is necessary that rollers on opposite sides of dwell rib portion 15 of the cam track be in firm contact with the cam track sidewalls. This no backlash condition is obtained in conventional drives by relative adjustment of the cam shaft and turret shaft distance for preloading. In the application of the present invention to production of roller gear drives, it will be found that the concept underlying the new roller gear drive makes pre-load inherent providing tolerances usual in the roller gear art are maintained. Circle 27 is a theoretical roller pitch circle in the cam axis plane of symmetry and constitutes the locus of the point of rolling contact of a roller as the roller moves about the turret axis.

Turret roller 25 has two separate motions. One motion is intermittent roller travel about the turret axis. The other motion is irregular rotation of a roller about its spindle axis 26a. This irregular rotation occurs when a roller is in a cam track. In dwell positions of the turret and cam, active rollers 28 and 29 rotate in opposite directions about their respective spindles when cam 12 is rotating about its axis. Since rollers 28 and 29 roll on opposite sides of cam rib 15, and assuming the direction of rotation of cam and turret as illustrated by the arrows, trailing roller 29 will turn counter-clockwise and leading roller 28 will turn clockwise as viewed from their respective spindle ends. Trailing roller 29 will move to a roller lead position and at some time as it assumes a lead position, must reverse its direction of irregular rotation. The reversal of direction of irregular rotation of roller 29 from one dwell to the next dwell is accomplished at cross over during the indexing travel of the turret. FIGS. 4 and 5 show the momentary theoretical position of a turret roller when the direction of irregular rotation is to be reversed.

As has been generally pointed out, the objective of the invention is to provide a theoretical point of rolling contact between a turret roller and cooperating cam track sidewall. Under load, some distortion of roller or track wall or both occurs. By having a relatively small difference between roller and sidewall curvatures of between about 3 to 5% in their radii in proper geometrical direction (as in ball bearing and in roller bearing designs) the roller and/or cam wall material will yield enough to enlarge the rolling contact point to a rolling contact area, with minimal distortion within desired limits of elasticity to avoid failure.

In those instances where a roller gear drive is not subject to substantial load, the rolling points contact between roller and cam track sidewall will not enlarge appreciably. Under such conditions, the differences in radii of curvatures between the two surfaces may be somewhat below or above the 3 to 5% range generally regarded as desirable in the ball and roller bearing art. By "proper geometrical direction" is meant as an example that a roller conoidal shape (which is preferred) should work with a cam sidewall having a somewhat larger radius of curvature in such a direction as to provide a concave sidewall curve. As another example, if a conical turret roller is used, thus providing a straight line profile (a view in side elevation of a roller) then a cam sidewall should have a convex profile (a view in section normal to the cam track length) with the radius of curvature of such sidewall being great enough to satisfy design requirements. A straight line profile theoretically has an infinite radius of curvature. In theory, no finite radius of wall curvature could be within 3 to 5%. In practice a good point contact may be provided. As a third example, a turret roller could have a slightly concave profile which would require a cam track sidewall whose profile would be convex with appropriate curvature differential for good design requirements. All such designs permit point contact to enlarge to small area contact with minimal material curvature distortion.

For overall design and operating factors, the conoidal roller profile and concave track wall profile are preferred, particularly for heavy duty work. This form provides for maximum cam track wall thickness at the track bottom and has advantages of wall strength and susceptibility to cam body heat treatment in connection with the choice and handling of cam body material.

FIGS. 3, 3A and 9 illustrate, in geometrically distorted form, a simple procedure for determining a conoid roller shape. This procedure is by way of example and has the merit of simplicity and practicality. It must be kept in mind that the curvature differences between roller and cam track sidewalls are small, for good design, and may involve two radii which differ by about 3–5% and in practical units may have differences of a few thousandths of an inch. Thus using roller 29 in dwell position purely as a matter of convenience, theoretical rolling contact point 29a is assumed about midway between roller base end 29b and roller tip end 29c. The general roller length and diameters will be dictated by well accepted engineering considerations in the roller bearing and ball bearing art.

Roller pitch circle 27 will thus be determined, this circle having as its radius the distance from assumed turret axis 23a to point 29a. The reason for taking point 29a about midway of the roller ends is to accommodate practical tolerances placing the roller contact within or without pitch circle 27 in the manufacture and operation of a new roller gear drive. From point 29a, line Ra is drawn toward point 29d at the edge of roller end 29b. Center point Rb on line Ra is taken and this center point may be taken one one or other side of point 29d or preferably on point 29d, as convenience dictates. It is understood that so far a two dimensional diagram, FIG. 3 is involved. From center point Rb (which, as pointed out may coincide with point 29d) circular arc 29e is drawn through point 29a to extend between roller ends 29b and 29c. Arc 29e is the roller profile and the surface of revolution described by arc 29e being revolved about roller axis 26a will define the active or working surface of the roller.

The next step is to determining active portion 40a of cutter 40 (see FIGS. 7 and 9) for generating the cam track in a cam body or blank. Cam body 12, secured on shaft 10 and rotatable about axis 10a may, for convenience, have a rough cam track provided therein to reduce cutting or grinding by cutter 40. Cam body 12 may be made of suitable steel, as tool steel, which is normally hard but which has been softened by heat treatment for working thereon and which will require heat treatment to restore its normal hardness. Cutter 40 has its axis 41 about which it is rotated at high speed by electric motor 42 for cutting. The entire cutting head consisting of cutter 40, a suitable drive shaft whose axis is coincident with cutter axis 41 and electric motor 42 together wtih axial cutter feed means 42a (for moving the cutter along axis 41 for depth of cut) is swingable about cutter pass axis 43.

Cutter pass axis 43 is parallel to turret axis 23a. As illustrated here, cutter pass axis 43 is laterally offset along line LC away from cam axis 10a. As will be further explained later as a modification, it is possible for cutter pass axis 43 to be coincident with axis 23a assumed for the turret.

Starting from roller contact point 29a, line 29g is drawn perpendicular to roller axis 26a. Line 29g is extended beyond the opposite roller profile point 29h to point 29j. The distance between points 29h and 29j is equal to the clearance desired between roller and cam track wall along line 29g. Point 29j should be well between cutter tip 40c and line 40d of the cutter where active portion 40a meets reserve portion 40b. Point 29j need not necessarily be at the midpoint between lines 40c and 40d, determining the axial length of cam cutting portion 40a of cutter 40. Cylindrical portion 40b of cutter 40 has its diameter equal to the cutter diameter at 40d and thus permits reserve portion 40b to be used gradually for cutter reshaping as part 40a of the cutter wears. Midway between points 29a and 29j is point 29k which will be on cutter axis 41 of cutter 40, the axis being perpendicular to the line between points 29a and 29j. Axis 41 is laterally offset from roller axis 26a and parallel thereto and the amount of lateral offset between axes 26a and 41 will be one-half of the desired roller to cam wall clearance in the completed drive. Cutter center point 29k is offset away from line LC beyond roller axis 26a at roller center point 29m. Cutter axis 41 intersects cam-turret line of centers LC at 43 to locate the cam pass axis about which the cutter is swung for generating a cam track.

The axial length of cutter portion 40a is great enough so that cutter portion 40a can generate a cam track wall of appropriate contour as illustrated in FIG. 1 for example. Profile curve 40p for cutter portion 40a should go through contact point 29a and end at lines 40c and 40d. The radius of curvature for profile curve 40p of the cutter should be a bit greater than that for the roller profile 29e. Center point Rb′ for the cutter profile arc may be located just beyond roller profile center point Rb on line Ra. The two radii for roller and cutter profiles should differ by about 3 to 5% for good action under load. Where no great loss is present, the cutter profile radius of curvature may be greater than the roller profile radius of curvature by any desired difference.

Such a cutter profile is simple to lay out and a control gauge curve can be readily made for applying to a cutter during dressing. It is understood that after a cutter profile has been obtained, the surface of revolution resulting from revolving the cutter profile about cutter axis 41 will be the active cutter surface.

The arcuate nature of roller and cam cutter (and cam wall) profiles makes it simple to provide profiles. However these profiles can be other than arcuate and can follow other curves. The objective is to provide conformal profiles for providing rolling contact.

Referring again to FIG. 7, a cutter pass about pass axis 43 will be over a sufficient pass angle for complete cam track generation. The pass movement or dwell of cutter 40 about cutter pass axis 43 must be synchronized with rotation of cam body 12. When cutter 40 is at one end of a pass (as shown in FIG. 7) there is dwell and cam body 12 must be turned in proper direction through one-half of the dwell angle after which cutter 40 begins its pass path toward the other end of its path where dwell will occur. Cutter depth feed to deepen the cam cut will occur when cutter 40 is at rest.

It is possible to provide for automatic tape control to govern and properly relate cam body rotation, cutter pass movement, pass angle and cutter depth feed for a particular cam body size and corresponding turret with a particular number of turret rollers. A special tape (or other control record means) produced by a suitable computer may be provided for each roller gear design desired. This will be more convenient than manipulating gear ratios between cam body rotation and cutter pass control.

The effects of lateral offset of the cutter and roller center points 29k and 29m at each dwell position is to preserve the location of predetermined rolling contact point 29a, established by cam generation, as the rolling contact point for a turret roller. The entire roller clearance from a track wall is beyond the roller at dwell. The track center, located by cutter center point 29k will thus be beyond roller center point 29m and beyond roller axis 26a, away from line of centers LC, in each dwell. As a cutter passes from one dwell position, on one side of line LC through LC and then to the other dwell position, the lateral offset between center points 29m and 29k becomes less, disappears at line LC and reverses its direction as the cutter reaches the next dwell.

The lateral offset for cutter center 29k with relation to roller center 29m for preserving the location of rolling contact point 29a on both roller and cam track wall may also be obtained by using turret axis 23a as a center for cutter pass travel providing the cutter axis 41, which now goes to axis 23a, begins to pass with sufficient offset so that cutter profile 40p will generate the cam track to establish the rolling contact point at a satisfactory location on the roller and cam track profiles. It is clear that cutter 40 will have its axis 41 tilted a bit to reach turret axis 23a and may tend to move the location of the point of rolling contact, shown as 29a in FIG. 9, upwardly toward center line LC. This action however will be so slight that the change in position of pitch circle 27 will be hardly noticeable. The important thing is to locate the cutter at each dwell position so that the point of rolling contact to be established on a cam track wall remains the same for a turret roller.

Thus in all instances, the common point on roller pitch circle 27 and cutter axis 41 in position corresponding to roller dwell will always be beyond the common point on pitch circle 27 and roller axis 26a in dwell, the offset always being away from line LC. It is evident that corresponding points on cutter and roller respectively, as for example points 29k and 29m or radially beyond these points, where pitch circle 27 is met, will have different arcuate path lengths, the cutter point in all instances travelling over the longer path.

A characteristic of the drive embodying the invention, independently of whether cutter pass axis 43 is offset from turret axis 23a or not, is that the angle between rolling points of contact for roller and cam wall in dwell positions remains exactly the same at cam track generation and when a turret is installed for cooperation with the cam to provide tight dwell positions. In conventional roller gear drives, the angle between roller dwell positions is the same as between cutter dwell positions. Because of this, take-up between turret and cam has been necessary for a tight dwell position. Consequently the geometry of the system during cam track generation is different substantially from the geometry of an assembled prior roller gear drive, preloaded for tight dwell.

Referring to FIG. 8 a cam track development is illustrated. Due to the three dimensional geometry involved, the showing in FIG. 8 must be considered as an approximation of desired theoretical characteristics. In FIGS. 7, 9 and 10, over a working angle of turret 22 (the angle between turret dwells), turret pitch circle 27 and cutter pass pitch circle 44 will intersect at roller dwells. Between dwells, roller pitch arc 27 will rise above cutter pass arc 44. The fall of pitch arc 27 at LC below cutter pass arc 44 will be very small and will be less than the offset of axes 43 and 23a, if there is offset, and will be much less, if not zero when no offset is provided. In any event, the roller clearance between dwells, and particularly at cross over, is maintained.

Offset between axes 43 and 23a when provided may range up to about .002" to .005" for most sizes of roller gear drives embodying the invention. In FIG. 8, cam rib portions 15A and 15B of dwell rib 15 show circles 48 representing cutter 40 in various positions along the cam track during generation of the final cam track. Since the cutter moves along the track for track generation, there will be an infinity of cutter positions along the track. The cutter circle diameter will be assumed along the assembled device. Throughout most of the track length, where two opposed sidewalls exit, the cutter circle will define the cam track width and the locus of cutter axis 41 at the points where the circles are drawn defines the track center at that level. Circles 49 (of which there should be an infinite number) are slightly smaller in diameter than circles 48 and represent the locus on a roller surface of the rolling point contact with a cam track sidewall point. In the theoretical situation assumed here, circle 49 should be the equator of a roller. Lines 48L and 49L are the respective loci of the cutter and roller circle centers. The angle between adjacent turret rollers and cam track and cam rib dimensions provides for tight fit on opposite sides of rib 15 during dwell. An opposing sidewall, at dwell if provided, will be clear of rollers. Track parts 19A and 19B are terminal portions and in this example are entrance and exits portions for a roller. The cam shown here is symmetrical and its direction of rotation can be reversed. The geometry of the system is essentially the same whether cutter pass axis 43 is offset or whether the alternative procedure is used.

Track portion 19C extends between the cam track dwells and contains theoretical cross over point P. Locus indicating curves 48L and 49L cross at point P. Left of point P in FIG. 8, roller circles 49 bear against the adjacent sidewall extending downwardly in FIG. 8 from rib portion 15A. Right of point P, roller circles bear against the adjacent side wall portion extending up from rib portion 15B. At P, a roller is theoretically clear of both track sidewalls as illustrated in FIG. 10. The amount of cam rotation required to complete cross over (where a roller goes from one sidewall to the opposite sidewall) will depend upon clearance between a roller and cam track and cam track pitch at cross over.

It is not necessary to have the full length of cam track terminal portions 19A and 19B provided with opposing sidewalls since rollers always clear one wall. Thus rib 15 will require sidewall extensions therefrom to track terminal portions. However no opposing sidewall to each such wall extensions are necessary because a roller will always bear against such rib extension sidewalls. Proper entry of a roller into a cam track will occur because of turret movement from the next forward roller which is well within the cam track.

The cooperating profiles of roller and cam track walls do not show any point of inflection. As is well-known, mathematically a point of inflection in a curve indicates a change in the algebraic sign of curvature.

Referring specifically to FIG. 9A, cutter 40 has its axis 41 tilted somewhat so that the entire cutter head makes its passes about an axis which is coincident with assumed turret axis 23a. In practice the amount of tilt will be very small. Thus a roller drive having roller pitch circle radius of the order of about 3 or 4 inches will normally involve a lateral offset between axes 23a and 43 in FIG. 3B of the order of about 2 to 5 thousandths of an inch. Thus it is clear that a tilt for having axes 43 and 23a coincident will be very small. In such an arrangement, however, it is still necessary to locate the end positions of each cutter pass so that an assumed point of rolling contact for the cutter will remain the same point of rolling contact after the cam track has been generated and a turret with rollers is provided. As shown in FIG. 9A, assumed point of rolling contact 129a may shift a bit from the assumed theoretical point 29a in connection with the offset referred to in FIG. 3B as an example. By assuming proper profiles for cutter and cam track wall—in general these profiles can be the same whether the procedure illustrated in FIG. 3B or FIG. 9A is used—the mid-location of an assumed point of rolling contact will permit the slight shift of rolling contact point 129a from rolling contact point 29a referred to in FIG. 3B and elsewhere where the same profile shapes are involved. As illustrated in FIG. 9A interior points 29m' and 29k' on the roller and cutter axes respectively will be offset and the amount of this offset will be very close to the offset indicated in FIG. 3B by points 29m and 29k. In FIG. 3B, the roller and turret axes are respectively perpendicular to line 29g whereas in FIG. 9A, this precise relationship is not true. Assuming line 29g is perpendicular to roller axis 26a, then cutter axis 41 will have an angle of a little less than 90 degrees with respect to the portion of line 29g lying between points 129a and 29k'.

Inasmuch as precision roller gear drives frequently involve tolerances of the order of a fraction of one thousandth of an inch, it is clear that the geometrical quantities inherent in a procedure conforming to FIG. 9A will be very small.

In the procedures conforming to the illustrations of FIGS. 3B and 9A, the departure in terms of angles and dimensions from prior practice where cutter and roller axes are both coincident (and require special preloading adjustment as dwell as previously described) may be quite small. However, such departure represents an embodiment utilizing the concept of having a cutter profile at a generated cam track wall providing a point of rolling contact identical with the point of rolling contact to be provided between the generated cam track wall and the roller. Thus at dwell, the turret and cam track can be assembled for tight dwell and permit the drive geometry to remain the same during operation. The amount of tilt of cutter axis 41 from roller axis 26a is quite small and no attempt is made to show proper proportions.

Referring now to FIG. 11, roller 60 has its profile 61 convex and cooperating with cam track wall profile 62 which is straight. Line 63 extending perpendicular to track wall 62 and passing through rolling contact point 64 will pass through center point 65 for generating roller profile 61. The difference in radii of curvature between cam track wall 62 and roller profile 61 will, of course, be greater than 5% but actual point contact may be attained.

FIG. 12 is the converse of FIG. 11 and shows roller 60' having substantially straight profile 61' cooperating with convex cam track wall profile 62'. Point 64' represents the rolling point of contact with line 63' having the same relation to the cooperating profiles as line 63 in FIG. 11. Center 65' is the point from which cam track wall profile 62' can be derived.

Referring now to FIG. 12A, roller 60a has concave profile 61a cooperating with convex cam track wall profile 62a. Line 63a goes through rolling point contact 64a and the centers of curvature of the profiles for both roller and cam track wall could lie on line 63a. The radii of curvature of the two profiles, will have the small difference in length for insuring rolling point contact. In this modification, roller profile 61a will have a slightly longer radius of curvature than cam track wall 62a. This profile arrangement will normally be the least desirable of the various profile modifications illustrated.

In these various profiles illustrated in FIGS. 11, 12 and 12A, the cam track wall may be generated in a manner generally similar to that disclosed in the earlier figures or in other ways. Insofar as roller profiles are concerned, the derivation of these may be generally the same as previously disclosed.

What is claimed is:

1. In a roller gear drive having a turret intermittently movable about a turret axis, said turret having a plurality of radially extending spindles disposed at equal angular intervals with each spindle having a roller disposed for rotation about its spindle axis, said drive also including a cam rotatable about a cam axis laterally offset from and perpendicular to said turret axis, said cam having a cam track thereon, said turret rollers successively engaging the sidewalls of said cam track in response to rotation of said cam, said cam track having turret dwell and turret movement sections, the improvement which comprises having, as the active cam side wall engaging surface of each roller, a surface of revolution about the roller axis to provide a roller profile free of any point of inflection; said sidewall of said cam track having a profile at a transverse track section similarly free of any point of inflection and having a curvature which differs sufficiently from the curvature of said roller profile and in such sense as to provide for theoretical rolling point contact between each roller and the cam track sidewall engaged thereby, the sense of such relative profiles being such that said point contact, under load, increases to a small area with minimum distortion of said roller and side wall, said cam track being wide enough to provide for clearance at all times between a roller and idle track sidewall, the cam track midway points between opposite sidewalls, at dwell, having an angle therebetween, with reference to the turret center, which differs from the angle between adjacent spindle axes, at dwell, to create cam wall clearance for rollers at each dwell position, said drive being characterized by being susceptible to assembly to a tight dwell relation between turret rollers and cam track and smooth roller travel between dwells, the same geometry for cam generation and drive operation being maintained.

2. The drive according to claim 1 wherein said roller profile is convex to provide a conoidal roller outer surface.

3. The drive according to claim 1 wherein said roller profile is convex to provide a conoidal roller outer surface and wherein the profile of the cooperating cam track sidewall containing the point of contact with a roller is [concave] *convex*.

4. The drive according to claim 1 wherein said roller profile is convex to provide a conoidal roller outer surface and wherein the profile of the cooperating cam track sidewall containing the point of contact with a roller is [concave] *convex* with the difference in radii of curvature being of the order of between about three and five percent.

5. The drive according to claim 4 wherein the curved profiles of said roller and cam track sidewalls are arcuate.

6. The drive according to claim 1 wherein at said dwell section said cam track is provided with adjacent cam track sidewalls and wherein each said sidewalls has a point of rolling contact thereon, said cam track sidewall contact points being on the arc of a circle whose center is offset from the center of an arc drawn through adjacent turret roller points of rolling contact, said offset being away from the cam axis along a line extending between the turret and cam axes perpendicular to both of such axes, the offset being determined by having the cutter axis during cam generation parallel to the roller axis.

7. The drive according to claim 6 wherein the amount of offset is of the order of about .004 inch.

8. The drive according to claim 1 wherein said roller profile is convex and wherein the cam track profile is straight.

9. The drive according to claim 1 wherein the roller profile is straight and wherein the cam track profile is convex.

10. The drive according to claim 1 wherein the roller profile is concave and wherein the cam track profile is convex, said roller profile having the longer radius of curvature than said cam track wall profile.

11. In a method of cutting a cam track in a globoidal cam of the type used in an intermittent roller gear drive, said cam having a cam axis, said drive including a turret rotatable around a turret axis and having a plurality of radially extending rollers, the step which comprises rotating a cutter for generating such cam track on a cutter pass axis laterally offset from the turret axis, the direction of offset being away from the cam axis and the amount of offset being sufficient to provide clearance between said rollers and said cam track through an operating cycle of such drive while permitting the turret and cam track to be initially assembled together so that a pair of said rollers and said cam track fit tightly at dwell to render unnecessary appreciable adjustment between turret and cam for eliminating backlash at dwell.

12. An indexing drive which comprises:

turret means mounted for rotation around a turret axis;

a plurality of rollers mounted on said turret means, each of said rollers having an axis of rotation extending radially from said turret axis, each of said rollers having substantially the same profile of a non-cylindrical configuration and being mounted on said turret at a predetermined constant radial distance from said turret axis; and cam means having an axis of rotation positioned perpendicular to and at a selected distance from said turret axis, said cam means having a cam track extending around said axis of rotation, said cam track having a dwell section which simultaneously and tightly contacts a pair of said rollers during a first portion of the rotation of said cam means around said axis of rotation, said cam track having an indexing section including first and second opposite side walls which straddle one of said rollers during a second portion of the rotation of said cam means around said axis of rotation, said first side wall contacting a first side of said one roller during said second portion of the rotation of said cam means for rotating said turret around said turret axis, said second side wall of said cam track being spaced from the opposite side of said one roller to permit rotation of said one roller along said first side wall free from interference from said second side wall.

13. The method of making a cam track in an indexing cam for use with a pair of followers mounted on a turret for rotation about a turret axis, said cam having a cam axis, said followers being mounted for rotation on follower axes extending normal to said turret axis, said follower axes defining a turret index angle, which method comprises:

locating said cam axis and said turret axis in mutually perpendicular relationship but separated by a selected distance;

locating a point on said turret axis where a cam axis plane of symmetry intersects said turret axis, said plane including said cam axis and being perpendicular to said turret axis;

mounting a cam cutter, having a cam cutter axis, for swinging motion about said point with said cam cutter axis lying in said turret axis plane of symmetry:, said cam cutter having transverse dimensions greater than corresponding transverse roller dimensions and a profile whose curvature, compared to that of said followers, provides for substantially rolling point contact between a follower and said cam track;

rotating said cam on said cam axis; and swinging said cam cutter around said point in timed relation with rotation of said cam on said cam axis and through an angle which exceeds said turret index angle as a direct function of the transverse dimensional differences between said cam cutter and said rollers.

14. The method of making a cam track in an indexing cam for use with a pair of followers mounted on a turret for rotation about a turret axis, said cam having a cam axis, said followers being mounted for rotation on follower axes extending normal to said turret axis, said follower axes defining a turret index angle, which method comprises:

locating said cam axis and said turret axis in mutually perpendicular relationship but separated by a selected distance;

locating a point on said turret axis where a cam axis plane of symmetry intersects said turret axis, said plane including said cam axis and being perpendicular to said turret axis;

selecting a second point in said cam axis plane of symmetry which is on a line where the cam axis plane of symmetry intersects a turret axis plane of symmetry, said turret axis plane of symmetry including said turret axis and being perpendicular to said cam axis, said second point being offset from said first point away from the cam axis, a distance small in comparison to said selected distance;

mounting a cam cutter, having a cam cutter axis, for swinging motion about said second point with said cam cutter axis lying in said cam axis plane of symmetry, said cam cutter having transverse dimensions greater than corresponding transverse roller dimensions and a profile whose curvature, compared to that of said followers, provides for substantially rolling point contact between a follower and said cam track;

rotating said cam on said cam axis; and swinging said cam cutter around said second point in timed relation with rotation of said cam on said cam axis and through an angle which exceeds said turret index angle as a direct function of the transverse dimensional differences between said cam cutter and said rollers.

15. The method of making a cam track in an indexing cam for use with a pair of roller followers, each of said rollers having a selected roller profile and being mounted on a turret for rotation on roller axes, said roller axes intersecting at a given angle at a turret axis on which said turret is mounted for rotation, adjacent surfaces of said rollers riding on opposite sides of a dwell portion of said cam track and opposite surfaces of said rollers clearing said cam track by a predetermined distance, which method comprises:

locating said cam axis and said turret axis in mutually perpendicular relationship spaced by a selected distance;

locating a point on said turret axis at which a plane including said cam axis and perpendicular to said turret axis intersects said turret axis;

locating a cam cutter axis in said plane parallel to one of said roller axes and spaced therefrom by one-half of said predetermined distance;

positioning said cam to locate the center line of said cam track in said plane, perpendicular to said cam axis and intersecting said turret axis at a second point;

mounting said cutter with said cam cutter axis intersecting said second point and for rotation on a cutter pass axis extending through said second point; and rotating said cutter on said cam cutter axis to cut said opposite sides of said cam track so that upon assembly of said turret and cam said adjacent roller surfaces will ride tightly along said opposite sides without adjustment of the location of said rollers relative to said cam.

16. An indexing drive which comprises:

turret means mounted for rotation around a turret axis;

a plurality of rollers mounted on said turret means for rotation around roller axes extending radially from said turret axis, each of said rollers having substantially the same sectional profile of a non-cylindrical configuration and being mounted at a fixed radial distance from said turret axis, said rollers having thereon theoretical points of rolling contact; and cam means having an axis of rotation positioned perpendicular to and at a selected distance from said turret axis, said cam means having a cam track extending around said axis of rotation, said cam track being formed in said cam by a cutter having a shape whose sectional profile is similar to the roller profile but differing from that of said rollers with a diameter exceeding that of said rollers, said diameter being measured perpendicular to an axis of rotation of said cutter at theoretical points of rolling contact corresponding to said points on said rollers, said cam track being formed by swinging said cutter about a cutter pass axis parallel to said turret axis and intersecting a line perpendicular to both said cam axis and said turret axis, said cam track having a dwell section which simultaneously and tightly contacts a pair of said rollers during a first portion of the rotation of said cam means around said axis of rotation, said cam track having an indexing section including first and second opposite sidewalls which straddle one of said rollers during another portion of the rotation of said cam means around said axis of rotation, said first sidewall contacting a first side of said one roller during said other portion of the rotation of said cam means for rotating said turret around said turret axis, said second sidewall of said cam track clearing the opposite side of said one roller by the amount which said cutter diameter exceeds said roller diameter to permit rotation of said one roller along said first sidewall free from interference from said second sidewall while permitting said simultaneous and tight contact between said pair of rollers and said dwell section during said first portion of said cam rotation.

17. A roller-cam drive, which comprises:

a turret mounted for rotation on a turret axis and having a plurality of equally spaced roller axes extending radially from said turret axis;

a roller mounted on said turret for rotation on each of said roller axes, each of said rollers having an outer surface of revolution defined by rotating a line around the respective roller axis, each of said outer surfaces having thereon a closed line of theoretical rolling contact defined by the intersection with said outer surface of a plane perpendicular to said roller axis and intersecting said roller axis at a given distance from said turret axis, each of said rollers having a predetermined diameter defined by a line in said plane intersecting said roller axis; and a cam mounted for rotation on a cam axis located perpendicular to said turret axis and spaced therefrom by a distance exceeding said given distance, said cam having a cam track formed therein with a dwell section and an indexing section, said dwell section having adjacent, oppositely facing surfaces, each of said adjacent surfaces being defined by an arc having a curvature which provides for substantially theoretical rolling point contact, said cam track having a contact line thereon which engages said closed line upon rolling movement of a roller along said dwell section, said indexing section having opposite sidewalls, each of said sidewalls being defined by said cam arc and having said contact line, said opposite sidewalls being spaced sufficiently to provide clearance between said roller and at least one of said sidewalls, the adjacent outer surfaces of adjacent rollers tightly engaging said oppositely facing surfaces of said dwell section to prevent backlash and movement of said turret during a dwell cycle, the outer surface of one of said rollers engaging one of said opposite sidewalls during an indexing cycle to rotate said turret on said turret axis, the opposite side of said outer surface of said roller clearing the other opposite sidewall to permit said roller to roll freely along said one opposite sidewall.

References Cited

The following references, cited by the Examiner, are of record in the patented file of this patent or the original patent.

UNITED STATES PATENTS

| | | | |
|---|---|---|---|
| 781,600 | 1/1905 | Hamachek | 74—426 |
| 1,098,371 | 6/1914 | Donnelly | 74—426 |
| 3,007,345 | 11/1961 | Hider | 74—393 |
| 3,349,734 | 10/1967 | Boser | 74—426 X |

LEONARD H. GERIN, Primary Examiner

U.S. Cl. X.R.

74—84, 426; 90—6, 9